United States Patent [19]

Elgas

[11] Patent Number: 5,718,871
[45] Date of Patent: Feb. 17, 1998

[54] LEAK PREVENTION IN BLOOD OXYGENATORS

[75] Inventor: Roger J. Elgas, Anaheim Hills, Calif.

[73] Assignee: Medtronic, Inc., Minneapolis, Minn.

[21] Appl. No.: 586,517

[22] Filed: Jan. 16, 1996

[51] Int. Cl.$^6$ ............... A61M 1/14; F28F 9/02
[52] U.S. Cl. ....................... 422/46; 165/158
[58] Field of Search ............... 422/45, 46, 48; 165/905, 158, 173; 261/104, DIG. 28; 210/436, 472

[56] References Cited

U.S. PATENT DOCUMENTS

| | | | |
|---|---|---|---|
| 4,975,247 | 12/1990 | Badolato | 422/48 |
| 5,043,140 | 8/1991 | Combs | 422/46 |
| 5,058,661 | 10/1991 | Oshiyama | 165/70 |
| 5,192,499 | 3/1993 | Sakai et al. | 422/46 |

FOREIGN PATENT DOCUMENTS 0292445  11/1988  European Pat. Off.

*Primary Examiner*—Robert J. Warden
*Assistant Examiner*—Alex Noguerola
*Attorney, Agent, or Firm*—Harry G. Weissenberger

[57] ABSTRACT

A tight seal is achieved in a blood oxygenator between the potting of the heat exchanger fibers and the rim of the heat exchanger container by extending the potting material over the rim and down, so that when the potting material shrinks during cure, the potting will become prestressed in the sealing direction against an outwardly facing wall of the container. The invention also provides a ring coextensive with the rim and spaced therefrom. The potting extends into the ring. This forms an air gap between the rim and the ring through which potting can extend. As a result, there is no possible leakage path between the blood and the heat exchange medium. Any leak that does occur discharges to atmosphere outside the container.

2 Claims, 3 Drawing Sheets

LEAK PREVENTION IN BLOOD OXYGENATORS

FIELD OF THE INVENTION

This invention relates to blood oxygenators, and more particularly to an oxygenator heat exchanger construction which prevents water or blood from leaking around the potting of the heat exchanger.

BACKGROUND OF THE INVENTION

Blood oxygenators typically consist of two major components: a heat exchanger section in which blood is conveyed through hollow fibers or tubes washed by heat exchange water, and an oxygenator section in which cooled blood washes around microporous hollow fibers filled with oxygen and other gases which are to be introduced into the blood.

The fiber bundles which constitute the heat exchanger may be formed from a rolled-up mat of parallel fibers which is placed into a heat exchanger container, then potted at both ends in the container and cut so as to present a large number of individual fiber paths from an inflow manifold to an outflow manifold. This conventional technique typically involves potting the heat exchanger fibers with polyurethane in a polycarbonate container.

In addition to providing support for the cut fiber ends, the potting of the heat exchanger provides a barrier which prevents water from entering the blood paths of the oxygenator. Unfortunately, the characteristics of the polyurethane potting and the polycarbonate container impose a tensile stress on the potting material which makes it want to pull away from the container walls as the polyurethane potting material shrinks during curing. Leaks at the potting-container interface are unacceptable.

The oxygenator fibers are conventionally wound on a hollow oxygenator core which, in the assembly of the oxygenator, is fitted over the heat exchanger container. The annular space between the oxygenator core and the heat exchanger container serves as a water leak path to atmosphere in the event of a failure of the core-to-core bond, as an additional safeguard. In the assembly of the oxygenator, the top of the oxygenator core is suspended from the rim of the heat exchanger container by an inwardly extending flange which engages the rim of the heat exchanger container. In order to prevent water leakage between the oxygenator section and the atmosphere, it is important that the core-to-container interface be a polycarbonate-to-polycarbonate interface so that ultraviolet-curable adhesives can be used to produce a strong, tight seal.

A need consequently exists for an arrangement in which the heat exchanger potting is effectively locked to the container so that it provides a tight seal and cannot pull away from the container wall during or after curing, while still preserving a polycarbonate-to-polycarbonate bond between the heat exchanger container and the oxygenator core, and providing a leak path to atmosphere.

SUMMARY OF THE INVENTION

The present invention fills the above need by overpotting, i.e. causing the potting to flow around the lip or rim of the heat exchanger container and lying against the outside as well as the inside of the container. In that manner, not only is the stress on the inner potting-container interface relieved, but any shrinkage which causes the potting to pull away from the inner container surface merely pulls the outer part of the potting even tighter against the outer container surface. A tight seal is thus achieved regardless of any shrinkage stresses in the potting.

In another aspect of the invention, a gap which allows the potting material to flow around the lip of the container is created by suspending the oxygenator core from a separate ring positioned above the heat exchanger container and spaced therefrom. This allows not only the above-described overpotting, but it also allows a polycarbonate-to-polycarbonate interface between the heat exchanger container and the oxygenator core. That type of interface is superior to the urethane-to-polycarbonate interface which the overpotting would otherwise require, because it allows the use of ultraviolet-curable adhesives which provide a superior sealing bond.

Another advantage of the spaced separate ring is that the air gap between the ring and the container lip prevents a water-to-blood leak even if a leak were to develop at the potting-container interface. This is true because any leakage path would go around the lip and be vented downward to atmosphere on the outside of the container, but would be blocked from reaching the blood path by the potting material filling the gap.

DESCRIPTION OF THE PREFERRED EMBODIMENTS

Figure 1:
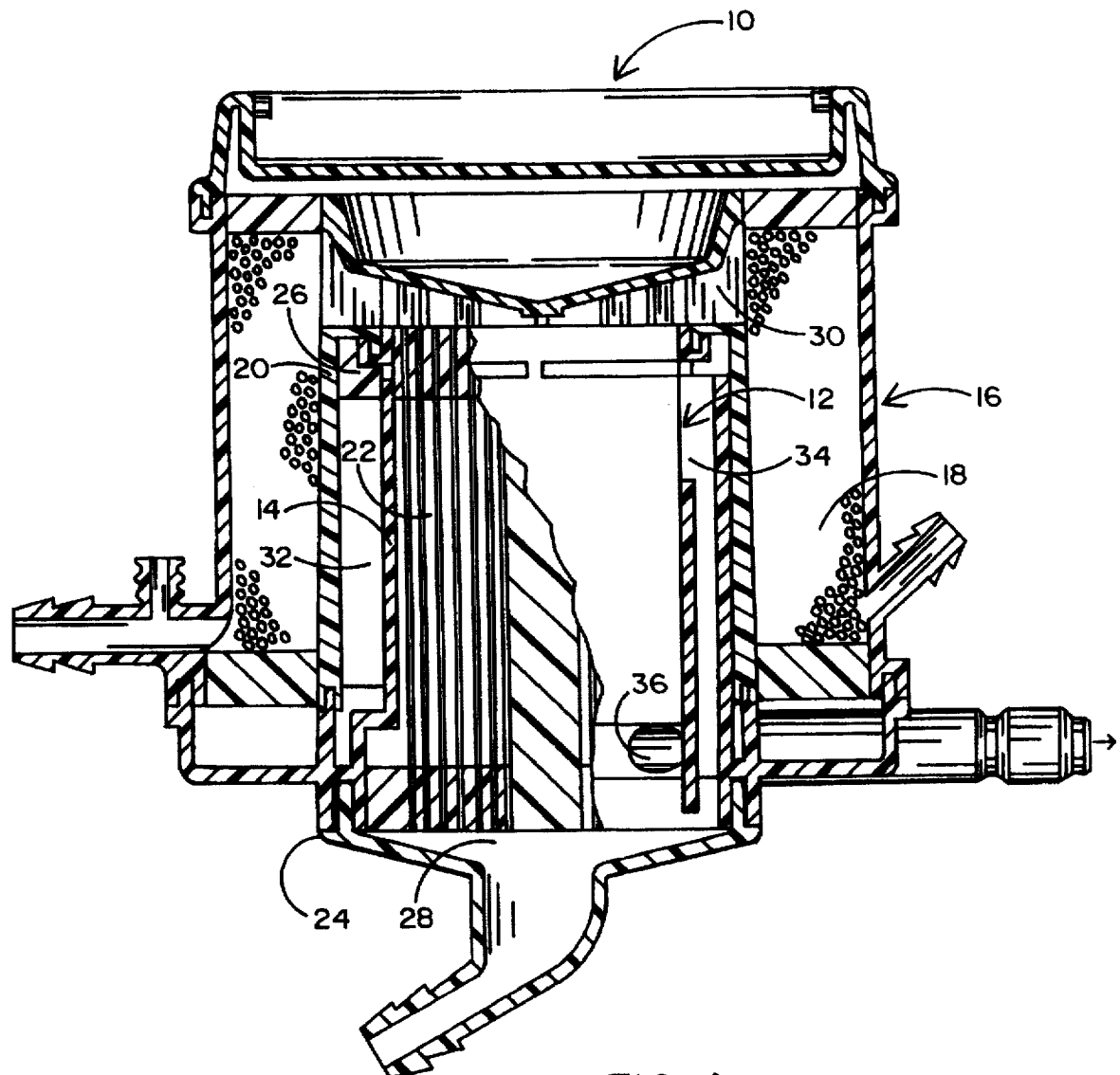
FIG. 1 is an axial section of an oxygenator according to the invention.

FIG. 1 shows a blood oxygenator 10 using the invention. The major components of the oxygenator 10 are the heat exchanger 12 contained in the container 14, and the oxygenation section 16 consisting of hollow fibers 18 wound on the oxygenator core 20. The upper and lower ends of the hollow heat exchanger fibers 22 are potted at 24 and 26, respectively, and are cut level with the surface of the container 14 to expose a multitude of openings permitting blood to flow through the heat exchanger fibers 22 from blood manifold 28 to blood manifold 30.

The heat exchanger fibers 22 are washed by water which flows through the annular space 32 molded into the the heat exchanger container 14 and enters the heat exchanger 12 at 34. Used water flows from the heat exchanger 12 at 36.

Figure 2:
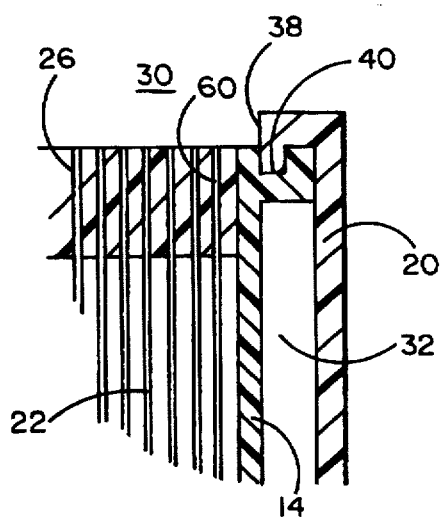
FIG. 2 is a detail fragmentary section of a prior art container structure.

FIG. 2 shows in detail how the heat exchanger 12 and the oxygenator core 20 would normally be assembled in the prior art. The hooked flange 38 of the oxygenator core 20 engages a channel 40 in the rim of the heat exchanger container 14. In that channel, the flange 38 is bonded to the container 14 preferably by an ultraviolet-curable adhesive which firmly bonds the polycarbonate core 20 to the polycarbonate container 14. This produces a strong, tight seal between the heat exchanger 12 and the blood manifold 30.

A problem with the construction of FIG. 2 is that the urethane potting 26 of the heat exchanger fibers 22 shrinks during cure, and although it adheres to the polycarbonate container 14, the shrinking tends to pull the potting 26 in a direction away from the inner wall of container 14. The interface between the potting 26 and the container 14 is thus prestressed in the direction of failure.

Figure 3:
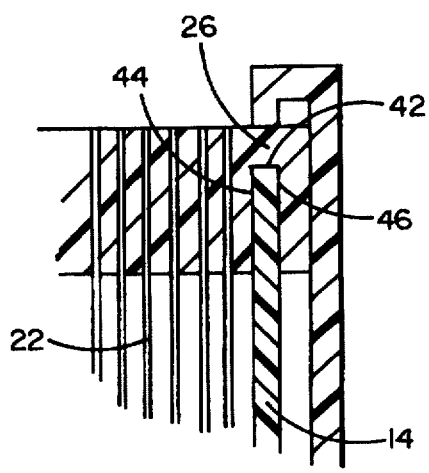
FIG. 3 is a detail fragmentary section similar to FIG. 2 but showing the inventive structure.

In accordance with the invention, as shown in FIG. 3, the potting 26 is extended upward and outward over the rim 42 of the heat exchanger container 14. When the urethane potting now shrinks during cure, the area 44 of the potting-container interface is still prestressed in the direction of separation, but the area 46 on the outside of container 14 is prestressed toward a tighter seal. Consequently, even if a fissure occurs in the area 44, water in the heat exchanger fiber area 22 remains tightly contained by the area 46 of the potting-container interface.

Figure 4:
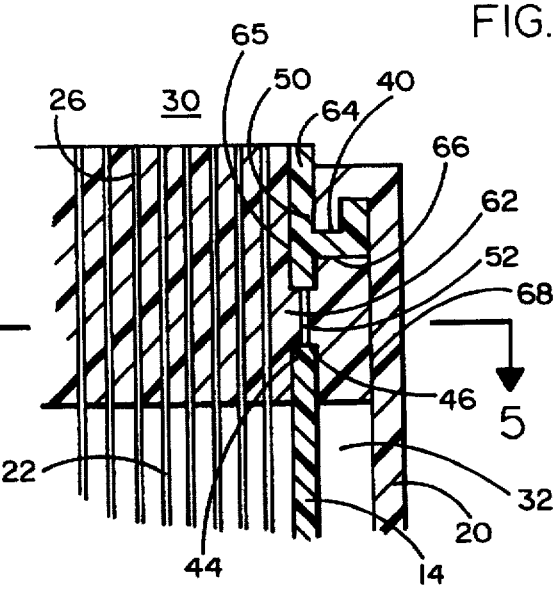
FIG. 4 is a detail fragmentary section similar to FIG. 3 but showing an additional feature of the invention.
Figure 5:
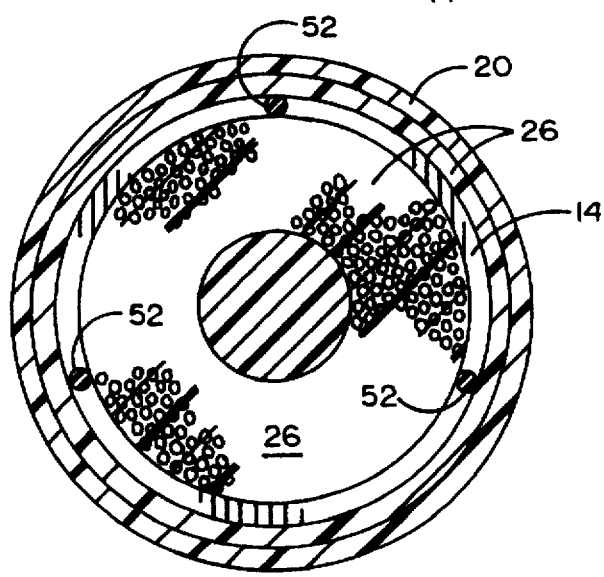
FIG. 5 is a section through the heat exchanger at the level of line 5—5 of FIG. 4.
Figure 6A:
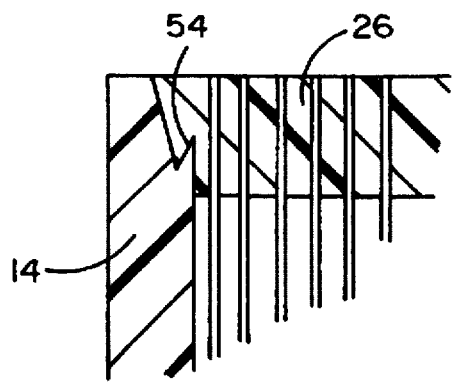
FIGS. 6a through 6f are detail fragmentary sections similar to FIG. 3 but showing various embodiments of the invention.
Figure 6B:
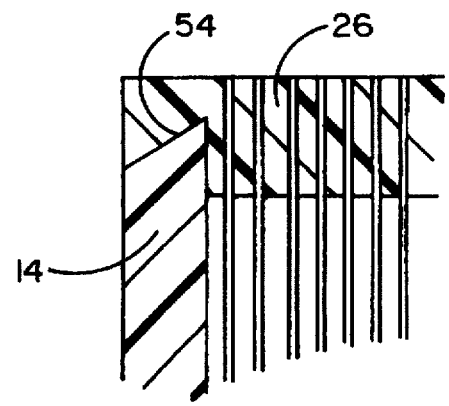
Figure 6C:
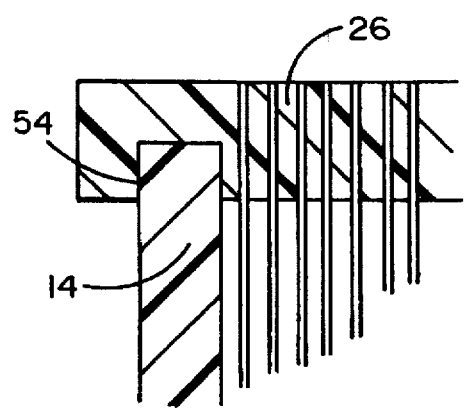
Figure 6D:
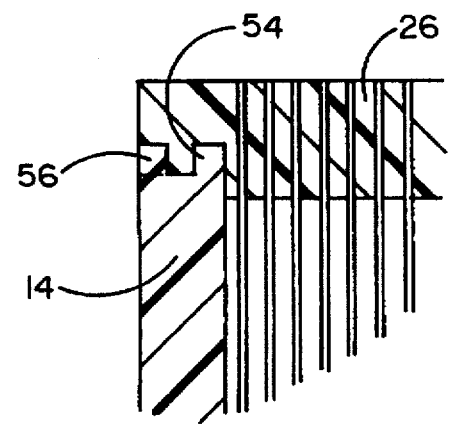
Figure 6E:
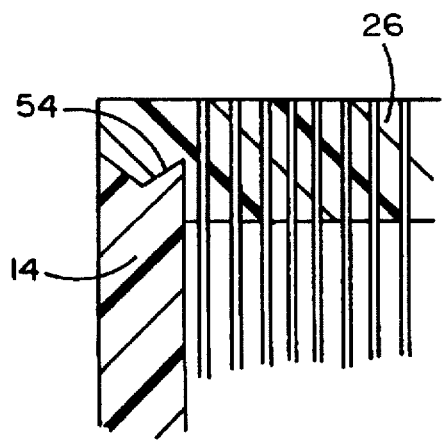
Figure 6F:
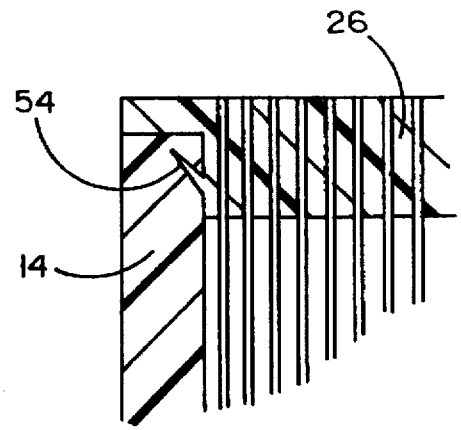

It will be noted in FIG. 3 that the overpotting prevents the use of the polycarbonate-to-polycarbonate bond of FIG. 2 between the oxygenator core 20 and the container 14 when the oxygenator core is slipped over the container 14. This problem is solved, in accordance with another aspect of the invention, by the structure of FIG. 4 in which a separate core suspension ring 50 is disposed above the rim 42. The ring 50 is attached to, and held spaced from, the rim 42 by a few small feet 52. In this manner, the potting 26 is firmly held against the area 46 of the outer surface of container 14, yet the water manifold 32 and the blood manifold 30 are sealed off from each other by a tight polycarbonate-to-polycarbonate adhesive seal as was the case in FIG. 2.

The ring 50 also has another, even more significant, function. In the construction of FIG. 2, an adhesion defect at the potting-container interface 60 creates a leakage path between the blood in manifold 30 and the heat exchange water in the container 14. The air gap 62 (FIG. 4) between the ring 50 and the lip of container 14, which is filled with the potting 26, causes any leakage that does develop between the potting 26 and the container 14 to be diverted over the lip of container 14, down along the outer surface 46 of container 14, and out to atmosphere in the annular space 32. Likewise, any blood seepage that may occur in a defective seal at the inner surface 65 of the ring 50 would have to flow along interfaces 66 and 68 and would also be discharged to atmosphere in space 32. The solid layer of potting extending all the way out to interface 68 provides a barrier which prevents any leakage between the blood manifold 30 and the interior of the heat exchanger container 14.

FIGS. 6a–6f show, by way of example, other ways of obtaining a potting configuration in which shrinkage of the potting causes an area 54 of the potting-container interface to be prestressed in the tightening rather than lossening direction. In some of the embodiments of FIGS. 6a–f, the overpotting according to the invention involves filling a channel such as the channel 54 of FIG. 6d. There may be a danger in such structures that the bottom of the channel may trap air and prevent the potting material from filling the channel. This problem can be prevented by either providing exhaust slots such as 56, or by omitting the channel structure as in FIGS. 6b and 6c.

It is understood that the exemplary water leak prevention in blood oxygenators described herein and shown in the drawings represents only a presently preferred embodiment of the invention. Indeed, various modifications and additions may be made to such embodiment without departing from the spirit and scope of the invention. Thus, other modifications and additions may be obvious to those skilled in the art and may be implemented to adapt the present invention for use in a variety of different applications.

I claim:

1. A blood oxygenator, comprising:
   a) a heat exchanger section including a container having a rim;
   b) said container including a ring circumferentially coextensive with said rim but spaced therefrom above said rim;
   c) an oxygenation section including an oxygenator core suspended from said ring and extending around said container;
   d) a fiber bundle extending in said container lengthwise thereof;
   e) potting for securing said fiber bundle at an end of said container, said potting being subject to shrinkage and being arranged to adhere to said container to form a watertight seal therewith;
   f) said potting extending through the space between said rim and said ring and along the outside wall of said container in each direction from said space;
   g) said core being bonded to said ring to provide a watertight seal therebetween.

2. A heat exchanger for blood oxygenators, comprising:
   a) a container having a rim;
   b) a fiber bundle extending in said container lengthwise thereof;
   c) a support ring circumferentially coextensive with said rim for supporting an oxygenator, said ring overlying said rim and spaced therefrom to form an air gap therebetween; and
   d) potting for securing said fiber bundle at an end of said container in sealing relationship therewith;
   e) said potting extending longitudinally beyond said rim in sealing relationship with said ring, and laterally through said gap onto the outside wall surface of said container and ring so as to vent any leakage path between said potting and said container to atmosphere.

* * * * *

UNITED STATES PATENT AND TRADEMARK OFFICE
CERTIFICATE OF CORRECTION

PATENT NO. : 5,718,871
DATED : 17 February 1998
INVENTOR(S) : Robert F. Gremel and Roger J. Elgas It is certified that error appears in the above–identified patent and that said Letters Patent are hereby corrected as shown below:

Title page, item [75],
The inventors should be named as follows:

Robert F. Gremel, Huntington Beach, Calif.   and

Roger J. Elgas, Anaheim Hills, Calif.

Signed and Sealed this

Fourth Day of April, 2000

Attest:

Attesting Officer

Q. TODD DICKINSON

Director of Patents and Trademarks